United States Patent [19]
Hollis et al.

[11] Patent Number: 4,761,812
[45] Date of Patent: Aug. 2, 1988

[54] CONSTANT POWER TELEPHONE LINE CIRCUIT

[75] Inventors: David L. Hollis, Morrisville; John L. Reynolds, III, Raleigh, both of N.C.

[73] Assignee: U.S. Holding Company, Inc., New York, N.Y.

[21] Appl. No.: 807,085

[22] Filed: Dec. 10, 1985

[51] Int. Cl.$^4$ .......................................... H04M 19/00
[52] U.S. Cl. ............................ 379/413; 379/399; 363/21
[58] Field of Search ........ 179/70, 77, 18 FA, 16 AA, 179/16 F; 363/21, 97; 379/322, 324, 413, 399, 400, 401

[56] References Cited

U.S. PATENT DOCUMENTS

| | | | |
|---|---|---|---|
| 4,301,497 | 11/1981 | Johari | 363/21 |
| 4,402,039 | 8/1983 | Jirka | 363/21 |
| 4,429,186 | 1/1984 | Gartner | 379/377 |
| 4,511,763 | 4/1985 | Skidanenko et al. | 379/413 |
| 4,552,994 | 11/1985 | Skidanenko et al. | 379/351 |
| 4,598,173 | 7/1986 | Chea, Jr. et al. | 379/339 |
| 4,602,130 | 7/1986 | Chea, Jr. | 379/324 |

FOREIGN PATENT DOCUMENTS

| | | | |
|---|---|---|---|
| 0063618 | 5/1981 | Japan | 363/21 |
| 0133987 | 10/1981 | Japan | 363/97 |

Primary Examiner—Jin F. Ng
Assistant Examiner—Randall S. Vaas
Attorney, Agent, or Firm—Christie, Parker & Hale

[57] ABSTRACT

A line circuit is described which provides isolated power to a subscriber telephone line in a manner that produces a constant power characteristic over the normal range of telephone line loop resistance. The isolated feed characteristic of the present invention simplifies protection against lightning and other transients. The constant power characteristic limits power dissipation under short loop, i.e. low resistance, or short circuit conditions yet allows enough current flow under short loop conditions to activate the voice level reducing varistor in the telephone sufficiently to prevent excessive loudness. This eliminates the need for additional circuits at the telephone central office for detecting short loops and for providing voice frequency (VF) level attenuation under such conditions.

3 Claims, 5 Drawing Sheets

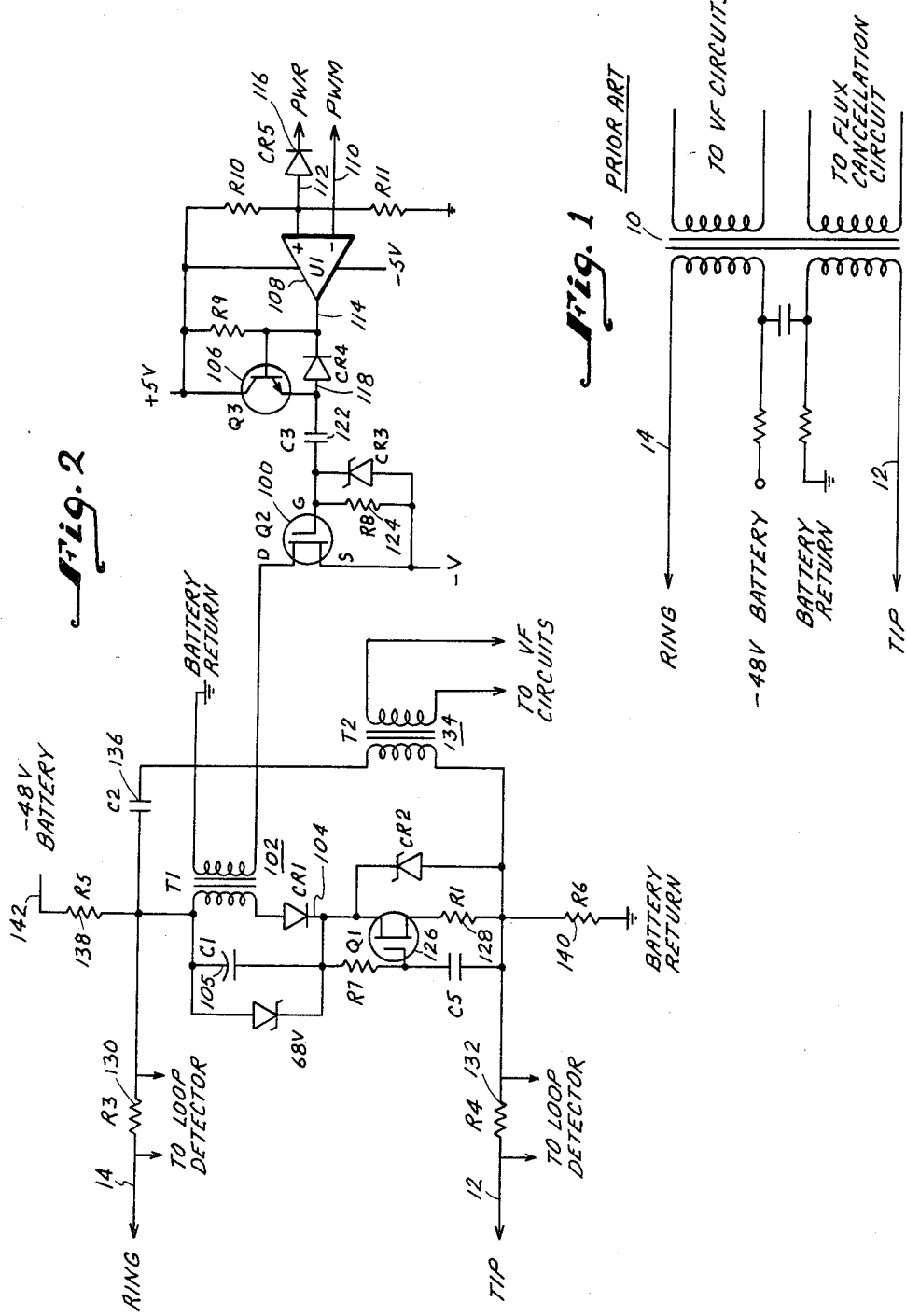

CONSTANT POWER TELEPHONE LINE CIRCUIT

CROSS REFERENCE TO RELATED APPLICATIONS

U.S. Ser. Nos. 598,650, of Ramon C. W. Chea, Jr. filed on 04/10/84; 660,585, of Ramon C. W. Chea, Jr. filed on 10/15/84 and; 660,591, of Ramon C. W. Chea, Jr. filed on 10/15/84, all of which are assigned to the same assignee as the present application.

BACKGROUND OF THE INVENTION

1. Field of the Invention

The present invention relates generally to the provision of constant power to telephone subscriber loops and more particularly to circuitry for providing power feed through a small power converter having an isolated output circuit and a constant power characteristic.

The line circuit of the present invention may be used as a line interface circuit in a telephone central office switch, in a subscriber carrier system or in a channel bank. Other fields of application are as a subscriber line interface, a two-wire exchange line interface with loop start or ground start or as an originating two-wire trunk line interface.

2. Description of the Prior Art

The subscriber line feed function associated with a classic telephone circuit is essentially equivalent to two resistors which are designated as line feed resistors in series with the central office battery. The value of the battery is in the range of 48 to 60 volts, and the resistors typically vary between 200 to 800 ohms depending upon the particular telephone exchange. The line feed resistors are selected at the central office to be of a value necessary to produce the proper line current versus loop resistance characteristics as expected by the telephone instrument. As is understood, a long telephone line indicates a large resistance, while a short telephone line has less of a resistance. The line feed resistors are placed in series with the telephone line and are selected according to the desired loop current characteristics. In any event, these resistors dissipate a relatively large amount of power and cause thermal problems at the central office.

Various telephone subscriber line interface circuit techniques are known in the prior art for controlling telephone subscriber loop current. Examples of circuitry for implementing such prior art techniques are provided with reference to U.S. Pat. Nos. 4,161,633, Subscriber Line/Trunk Circuit; 4,315,106, Apparatus for Regulating Current Supplied to a Telephone Line Circuit of the Type Employed in Digital Telephone Systems; 4,317,963, Subscriber Line Interface Circuit Utilizing Impedance Synthesizer and Shared Voltage Source for Loop Current Regulation Control; and 4,387,273, Subscriber Line Interface Circuit with Impedance Synthesizer, all of which describe techniques for the provision of regulated line current to telephone subscriber loops, and all of which are assigned to the same assignee as the present invention.

Other line feed circuits of the prior art have consisted of a transformer with a split winding on the telephone side, a pair of matched resistors connected from the inside of the split winding to battery and ground, with the outside of the split winding being connected to the tip and ring wires of the subscriber loop that are coupled to the subscriber's telephone; and a third winding connected to the voice frequency (VF) circuits in the telephone line interface circuitry. An example of another circuit of the prior art can be found with reference to the Bell System Technical Journal, Vol. 61, No. 4, April 1982, pp. 451–455, titled Pheripheral Systems Architecture and Circuit Design, J. M. Adrian, et al.

FIG. 1 is an example of a prior art telephone line circuit. With reference to the line circuit of FIG. 1, the transformer 10 must pass the current that operates a telephone coupled to tip and ring lines 12 and 14. Thus, transformer 10 must either be a large transformer with a gapped core, or a smaller transformer with a fourth winding and an additional circuit to generate an opposing dc current to cancel the flux in the core. Such a circuit has a number of drawbacks.

When the external loop is short, i.e. low resistance, a relatively high current flows in the circuit. Since the battery voltage is fixed, most of the power supplied is dissipated in the feed resistors and transformer windings. This results in an unnecessarily high power required to drive the telephone circuit and a high dissipation in the central office line interface equipment.

Surges from lightning or ac power crosses go to battery and ground through the transformer windings and feed resistors. These are relatively low resistances, so large currents flow. It is difficult to protect the line circuits from these large currents, hence large components are required.

A short circuit from the side of the line connected to battery and to ground has only one feed resistor and a transformer winding to limit current. A large current will flow and large feed resistors and transformer wire size are required to withstand this current.

Other line circuits of the prior art do not provide a constant power feed but rather provide lower power output as the subscriber loop resistance is decreased. Such techniques of the prior art may result in lower power dissipation; however, the current output under short loop, i.e. low resistance conditions, would be too low to fully activate the varsitors in the telephone to reduce voice frequency levels. This results in the telephone sounding too loud unless additional circuit means are provided at the central office switch to detect short loops and attentuate the voice frequency level appropriately.

SUMMARY OF THE INVENTION

A line circuit is described which provides isolated power to a subscriber telephone line in a manner that produces a constant power characteristic over the normal range of telephone line loop resistance. The isolated feed characteristic of the present invention simplifies protection against lightning and other transients. The constant power characteristic limits power dissipation under short loop, i.e. low resistance, or short circuit conditions yet allows enough current flow under short loop conditions to activate the voice level reducing varistor in the telephone sufficiently to prevent excessive loudness. This eliminates the need for additional circuits at the telephone central for detecting short loops and for providing voice frequency (VF) level attenuation under such conditions.

The line circuit of the present invention consists of a small DC/DC power converter that operates at a fixed frequency determined by the system clock oscillator, and that delivers a fixed energy pulse to its output with each clock pulse, regardless of load resistance or applied voltage. This produces a fixed power output, regardless of load resistance or applied voltage. The voice frequency (VF) circuit may be coupled into the power output in a plurality of possible manners, but is electrically isolated from the power converter by a means that appears as a high impedance at voice frequencies and as a low impedance at dc.

An objective of the line circuit of the present invention is to provide power feed through a small power converter having an electrically isolated output circuit and a constant power characteristic, with a relatively high resistance from the subscriber line to the battery or ground. If a surge is introduced in the subscriber line, such as by lightning, much smaller currents flow in the line circuit, thereby substantially reducing the problem of protection against such surges. By providing power feed through a power converter instead of by means of feed resistors connected to a battery source, the power dissipated in the line circuit is substantially reduced under average to short telephone subscriber loop conditions. This is as a result of the power converter acting to generate a lower output voltage at relatively high efficiency under conditions where the feed resistors must cause a relatively high voltage drop from the battery to provide feed current to a low resistance load. By providing a constant power feed characteristic, the feed current is much lower under short loop conditions (about half) so that power consumption from the central or local office power source is also reduced. Furthermore, a short circuit from the battery side of the line to ground does not result in high current flow in the circuit.

A further advantage of the invention is that the circuitry required for implementation requires few components, hence it can be implemented using discrete components without occupying excessive space on a circuit board, and without integrated circuitry.

Finally, by providing a constant power feed characteristic, the current supplied to the subscriber's telephone is high enough under short loop conditions to sufficiently activate the varistors in the telephone to reduce the voice frequency (VF) level, but low enough to reduce power dissipation in the line circuit.

The foregoing and additional objectives and advantages of the present invention will become apparent with reference to the drawings and detailed description thereof, wherein:

BRIEF DESCRIPTION OF THE DRAWINGS

FIG. 1 is a simplified schematic of a line feed circuit of the prior art.

FIG. 2 illustrates a constant power line feed circuit in accordance with the invention.

DESCRIPTION OF THE PREFERRED EMBODIMENT

Figure 3:
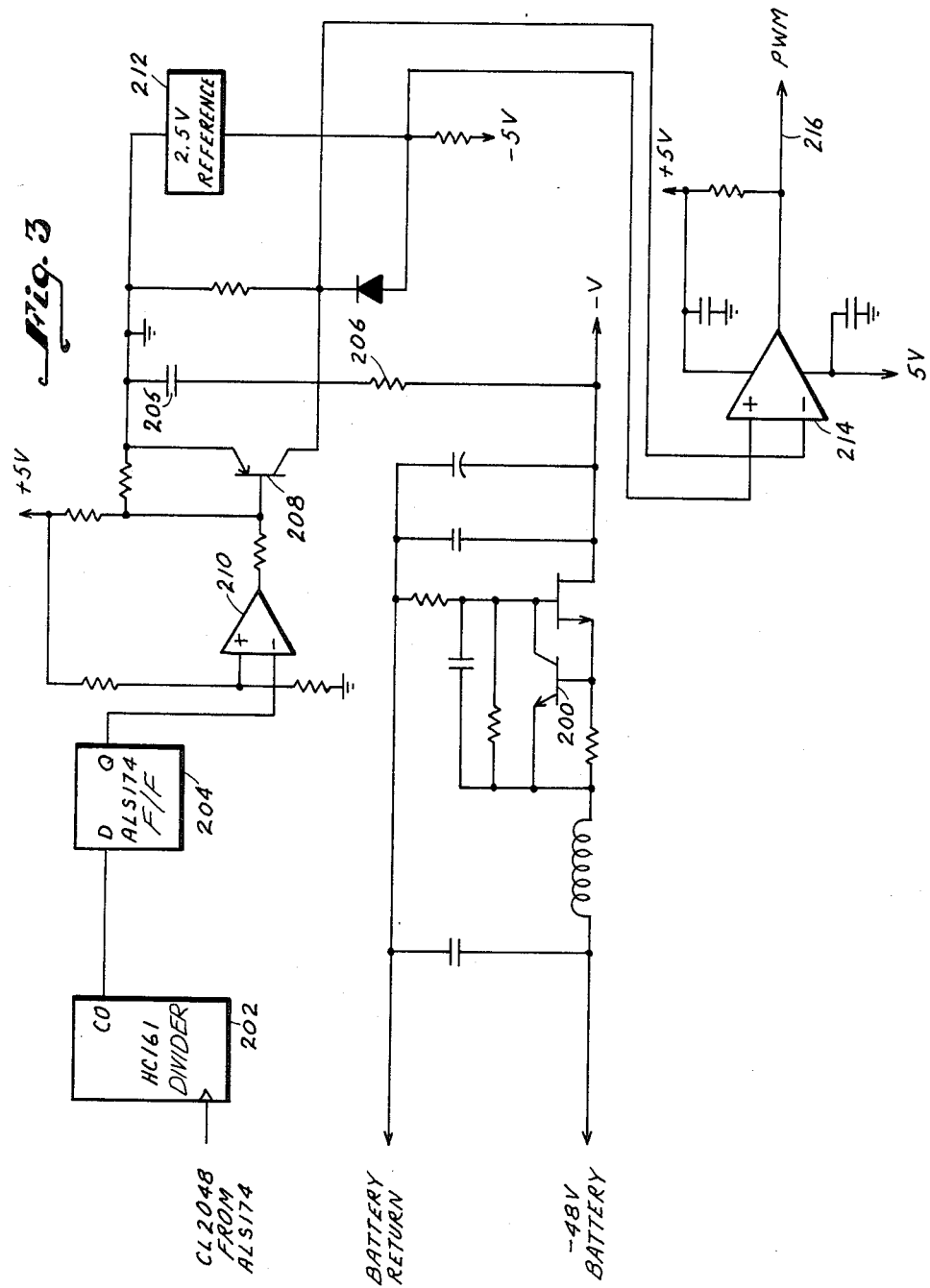
FIG. 3 is a further schematic of the circuitry associated with the line feed circuit of FIG. 2.

Referring now to FIGS. 2 and 3, the line circuit of the present invention is illustrated. FIG. 2 is a schematic of the per-line portion of the circuit and FIG. 3 is a schematic of the portion of the line circuit that is common to a plurality of lines. Transistor Q2 at 100, transformer T1 at 102, rectifier diode CR1 at 104, and filter capacitor C1 at 105 comprise a flyback type switching power converter. In a flyback switching power converter, the transformer 102 has a gapped core so that it can store energy in the core and not saturate with a DC current component in the winding. The transformer primary to secondary polarity is such that when the switching transistor 100 is conducting, the rectifier diode 104 is reverse biased. Current builds up in the primary winding of transformer 102 while transistor 100 is conducting, causing flux to build up in the transformer core. When transistor 100 switches OFF, the polarity of the primary and secondary winding voltages reverse and rectifier diode 104 becomes forward biased. If transistor 100 remains OFF for a sufficient time, the energy stored in the transformer core must discharge completely (except for a small residual) by forcing current through rectifier diode 104 into filter capacitor 105 and into the load.

If the current in the primary winding is allowed to build up to a fixed value when transistor 100 is conducting and the transformer core is allowed to discharge completely when transistor 100 is switched OFF, then a fixed amount of energy will be delivered to the load on tip and ring lines 12 and 14 during each cycle of operation, regardless of the load resistance. If the repetition rate of this action is fixed i.e. at constant frequency, then the power delivered to the load will be constant, regardless of the load resistance.

There are two means by which the current in the primary winding of transformer 102 may be allowed to build up to a fixed value and then for transistor 100 to be switched OFF; that of monitoring the current and switching OFF transistor 100 when the current reaches a given value; and that of supplying a controlled repetative driving pulse to transistor 100 with a pulsewidth that is inversely proportional to the voltage applied to the transformer 102 primary winding through transistor 100. The later method is used in the illustrated circuit of FIG. 2.

Transistor Q3 at 106 and comparator integrated circuit U1 at 108 and associated illustrated circuit components comprise a dirver circuit for the aforementioned power converter and allow the signal power to be turned ON or OFF on an individual subscriber line basis. The controlled repetative drive pulse is applied to the comparator 108 inverting input "PWM" at line 110. The non-inverting comparator 108 input at 112 is biased such that the drive pulse swings through the bias level so that the comparator 108 output switches following the PWM input. The PWR signal enables the comparator 108 output at 114, and is applied through diode CR5 at 116. When the PWR signal goes low, the bias level on the comparator 108 non-inverting input 112 is pulled below the low level of the PWM drive pulse waveform on line 110. Then the comparator output goes low and does not pulse.

The output circuit in the comparator 108 is a pull-down device only, hence a pull-up circuit is added to provide proper drive to a power FET device, such as transistor 100. Transistor 106, diode CR4 at 118 and resistor R9 at 120 form a pull-up circuit that is added to the comparator 108 output. The drive pulse from the comparator 108 and pull-up circuit is coupled to FET transistor 100 through capacitor C3 at 122. The drive circuit and transistor 100 operate about different circuit commons and the capacitor 122 couples the drive pulses across the difference in potential between the two commons. Resistor R8 at 124 and zener diode CR3 at 123 clamp the negative side of the drive pulse waveform to the potential of the source of the FET transistor 100.

The voltage generated by the power converter is applied to the subscriber line through FET transistor Q1 at 126 via resistor R1 at 128, and resistors R3 and R4 at 130 and 132 respectively.

The voice frequency (VF) signal is applied through transformer T2 at 134 and blocking capacitor C2 at 136. Transistor 126 and its associated components act as a high impedance at VF frequencies to isolate the VF signal at transformer 134 from the low AC impedance of the power converter output at capacitor 106, but allows DC current to pass with low impedance.

The circuits connected to transformer T2 at 134 at the point labelled "to VF CIRCUITS" constitute the normal two-wire to four wire conversion and analog-to-digital and digital-to-analog conversion circuits that function as an interface between the analog VF signal at transformer 134 and the digital signals in switching system to which the line circuit is coupled, and may be of known configuration.

Loop current detection is accomplished with a loop detector circuit connected to resistors 130 and 132, which may be of known configuration. Resistors R6 and R5 at 140 and 138 respectively bias the tip and ring line outputs to battery return (ground) and battery 142 respectively.

FIG. 3 illustrates a circuit for generating a pulse waveform of fixed frequency and with a pulsewidth inversely proportional to battery voltage. There are a number of conventional circuits available for this purpose, and the waveform generator of FIG. 3 is illustrative of one such circuit.

A transistor 200 and its associated circuitry provides a current limiter for start-up conditions to protect against transient current. A 2.048-MHz clock is coupled to a divider circuit at 202 of conventional design and to a flip-flop at 204 for division down to an operating frequency of 128-KHz. Capacitor 205 is charged towards −V through resistor 206 in an exponential manner. Capacitor 205 is periodically shorted by transistor 208, which is driven by comparator 210. The transistor 208 discharges capacitor 205 at the 128-KHz frequency, thereby resulting in a 128-KHz sawtooth waveform having a peak value proportional to the battery voltage and operating at a constant frequency. A voltage reference 212 and the sawtooth waveform are coupled to the inputs of a comparator 214. Whenever the magnitude of the sawtooth applied to comparator 214 is below the reference voltage 212, the output of the comparator 214 is negative. The output of comparator 214 on line 216 is a constant frequency but variable pulsewidth signal that shrinks with increasing battery voltage and which is applied as the PWM input on line 110 of FIG. 2. The circuit of FIG. 3 may be coupled to any desired number of the line circuits of FIG. 2, for example to eight such line circuits.

Figure 4:
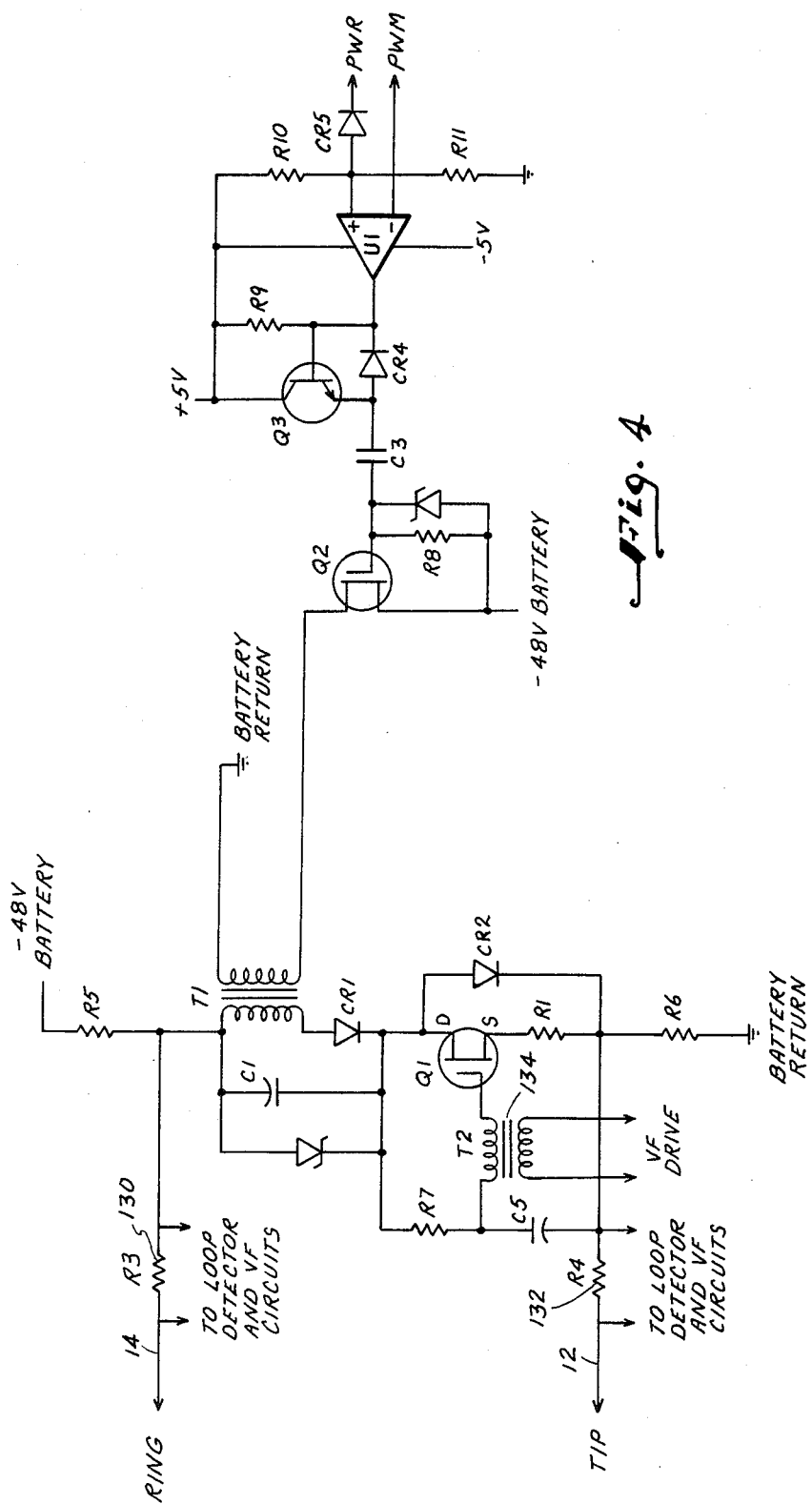
FIG. 4 is a schematic of another embodiment of the line feed circuit of applicants invention.

Another embodiment of the circuit described with reference to FIG. 2 is illustrated by FIG. 4, in which the VF signal in the direction toward the subscriber telephone tip and ring lines 12 and 14 is connected to the gate of FET transistor 126 and the VF signal coming from the subscriber telephone is detected across the series resistors 130 and 132. This allows for the use of a smaller VF transformer 134, since transistor 126 serves as a power amplifier, but requires that an impedance determining feedback network be connected between the two VF circuits. The remainder of the circuit of FIG. 4 is substantially the same as that described with reference to FIG. 2.

Figure 5:
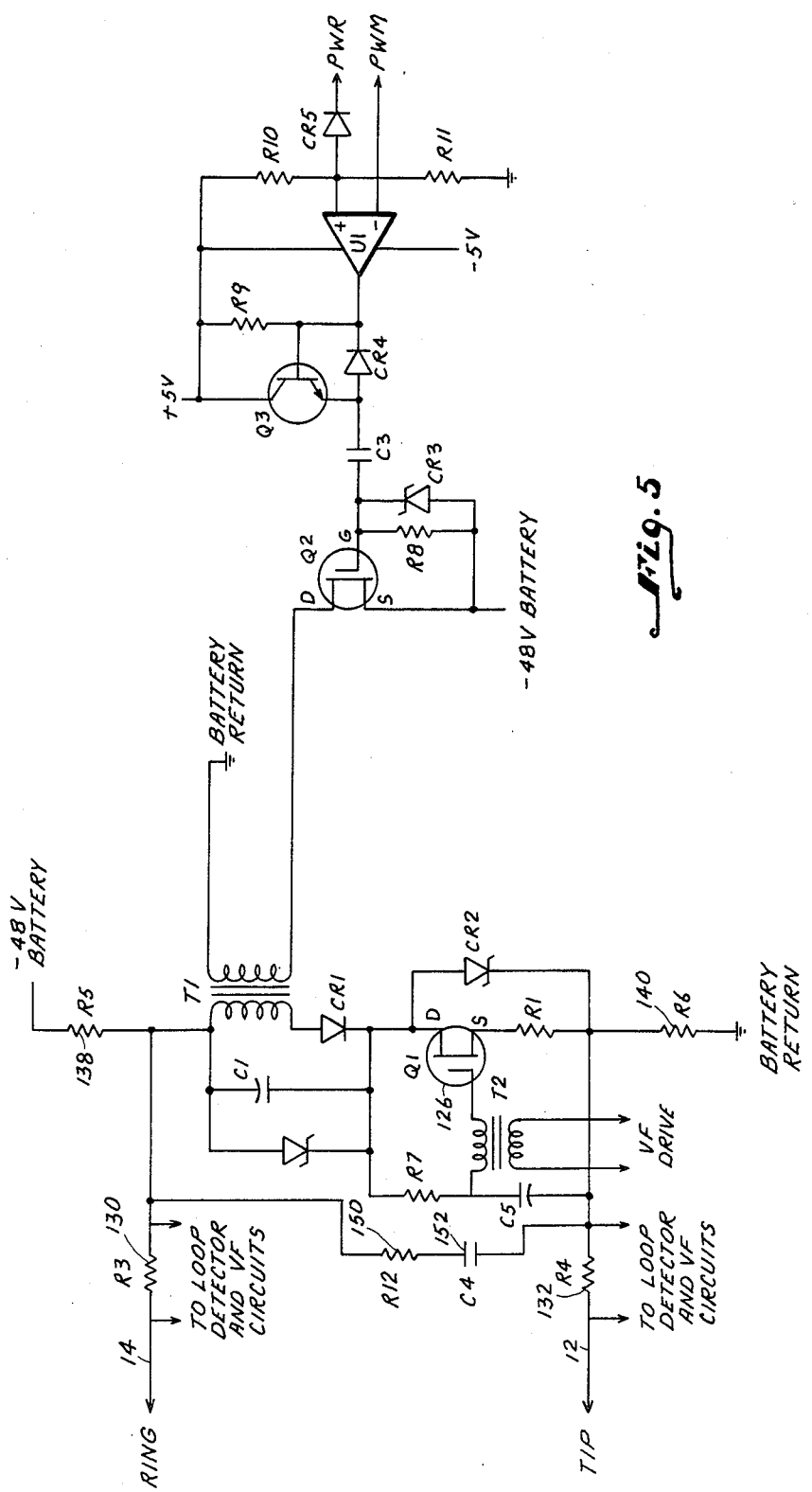
FIG. 5 is a schematic of another embodiment of the line feed circuit of applicants invention.

Another embodiment of the circuit of FIG. 2 is illustrated by FIG. 5, wherein the VF signal in the direction toward the subscriber's telephone at tip and ring lines 12 and 14 is again connected to the gate of transistor 126 and the VF signal coming from the subscriber's telephone is detected across resistor 130 and resistor 132. The input impedance in this case is determined by the series combination of resistors 130, 132, and R12 at 150, and capacitor C4 at 152, in parallel with the series combination of resistor 138 and resistor 140 for a total of 900 ohms and 2.2 microfarads in series. The circuit including transistor 126 acts as a high VF impedance so that it does not affect the input impedance. In this embodiment, the feedback network between the outgoing and incoming VF circuits to set the input impedance is not required. The remainder of the circuit of FIG. 5 is substantially the same as that of FIG. 2.

Figure 6:
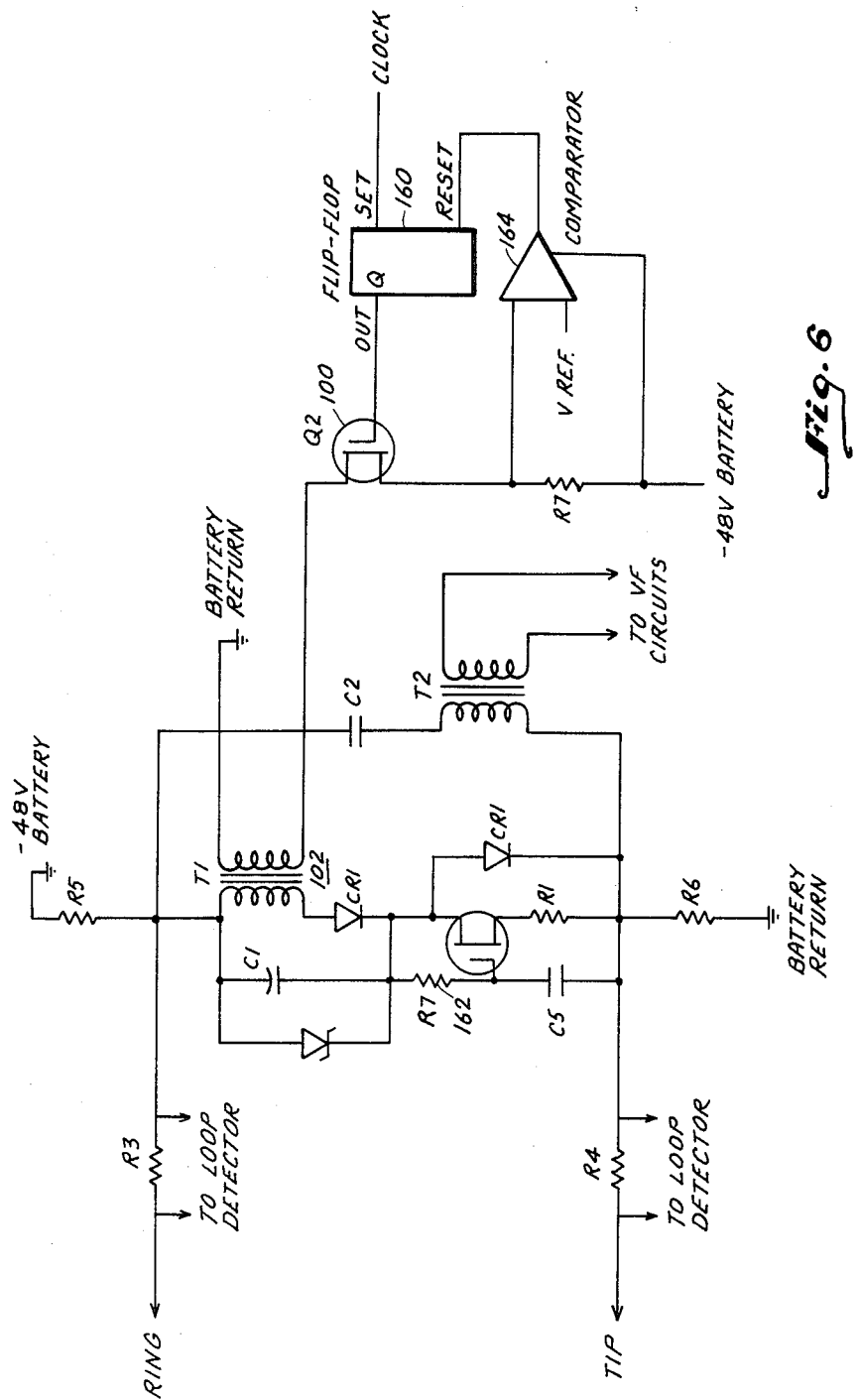
FIG. 6 is a schematic of another embodiment of the line feed circuit of applicants invention.

Another embodiment is illustrated by FIG. 6 in which an alternative control circuit for the switching transistor 100 is used. In the circuit of FIG. 6, the clock signal sets a flip-flop 160 which then turns ON the switching transistor 100. As current increases in the transformer 102, voltage increases across resistor R8 at 162. When this voltage exceeds a value equal to the reference voltage at the reference input of the comparator 164, the comparator 164 switches and resets the flip-flop 160, which turns the switching transistor 100 OFF. This cycle repeats with each clock pulse. A given current through a transformer creates a given amount of energy when the switch is opened. Since the circuit is operating at constant frequency, a constant power output, regardless of applied voltage or load is generated. The remainder of the circuit of FIG. 6 is substantially the same as that of FIG. 2.

While the present invention has been described in connection with a preferred embodiment thereof, it is to be understood that additional embodiments, modifications and applications which will become obvious to those skilled in the art are included within the spirit and scope of the invention as set forth by the claims appended hereto.

We claim:

1. A telephone line circuit for providing an isolated power feed to a two wire telephone subscriber line having a dc voltage source coupled thereto, comprising:

flyback switching power converter means including a switching transistor circuit, a transformer having a core and a primary winding with said primary winding being connected to said switching transistor circuit, and means for discharging energy stored in said core of said transformer to provide a constant power output;

means for applying a potential to said primary winding through said switching transistor circuit;

comparator means having first and second inputs and an output, said output being connected to said switching transistor circuit to control the conduction thereof;

means for applying a switching level to one of said first and second inputs of said comparator means;

means for supplying controlled repetitive constant frequency driving pulses to another of said first and second inputs of said comparator means, said driving pulses having a pulsewidth inversely proportional to potential applied to said primary winding through said switching transistor circuit to store a constant energy level in said core of said transformer;

coupling means for coupling said constant power output of said flyback switching power converter means to said telephone subscriber line during intervals when said switching transistor circuit is not applying current to said primary winding; and voice frequency circuit means coupled to a secondary winding of a second transformer, having a primary winding coupled to the said subscriber line whereby said voice frequency circuit means is electrically isolated from said flyback switching power converter means, wherein said coupling means has a high impedance at voice frequency and a low impedance at dc.

2. A telephone line circuit in accordance with claim 1 wherein said coupling means includes means for providing a low impedance dc path.

3. A telephone line circuit for providing an isolated power feed to a two wire telephone subscriber line having a dc voltage source coupled thereto, comprising:

flyback switching power converter means including a switching transistor circuit, a transformer having a core and a primary winding with said primary winding being connected to said switching transistor circuit, and means for discharging energy stored in said core of said transformer to provide a constant power output;

means for applying a potential to said primary winding through said switching transistor circuit;

comparator means having first and second inputs and an output, said output being connected to said switching transistor circuit to control the conduction thereof;

means for applying a switching level to one of said first and second inputs of said comparator means;

means for supplying controlled repetitive constant frequency driving pulses to another of said first and second inputs of said comparator means, said driving pulses having a pulsewidth inversely proportional to potential applied to said primary winding through said switching transistor circuit to store a constant energy level in said core of said transformer; and means including a power FET for coupling said constant power output of said flyback switching power converter means to said telephone subscriber line during intervals when said switching transistor circuit is not applying current to said primary winding.

* * * * *